May 16, 1972
J. F. GRUTSCH
WATER PURIFICATION PROCESS
3,663,435

Original Filed May 15, 1969

INVENTORS
James F. Grutsch
George C. Flood
BY
ATTORNEY

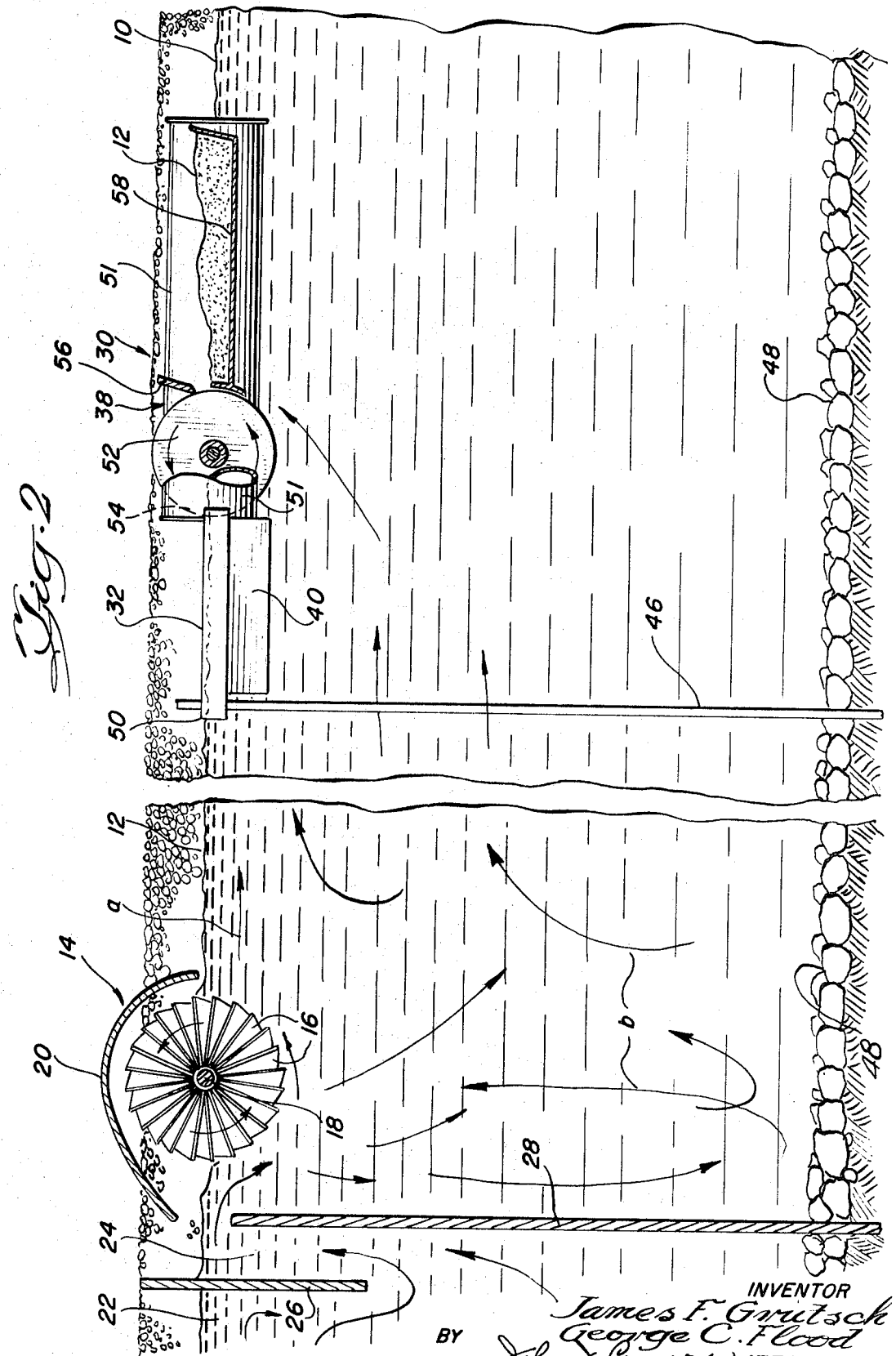

3,663,435
WATER PURIFICATION PROCESS
James F. Grutsch and George C. Flood, Hammond, Ind., assignors to Standard Oil Company, Chicago, Ill.
Continuation of application Ser. No. 824,781, May 15, 1969. This application Aug. 5, 1970, Ser. No. 61,419
Int. Cl. B03d 1/00
U.S. Cl. 210—44
1 Claim

ABSTRACT OF THE DISCLOSURE

Buoyant matter produced in a bioflotation lagoon is confined to the lagoon's upstream end by floating booms, and skimmers along the booms remove buoyant matter carried to the skimmers by the lagoon's surface currents.

---

This is a continuation of application No. 824,781, filed May 15, 1969, now abandoned.

BACKGROUND OF THE INVENTION

Waste-water must be purified before it is dumped into our country's rivers and lakes, and one purification method currently in use is illustrated in U.S. Pat. No. 2,948,677. This patent teaches passing waste-water through a lagoon in which thrive aquatic microorganisms, and simultaneously at the lagoon's upstream end, beating air into the lagoon's surface. The microorganisms feed on pollutants in the water and produce a sludge which accumulates impurities in the water, and the air beaten into the surface of the lagoon forms a myriad of tiny bubbles which are entrapped in the sludge. These entrapped air bubbles buoy up the sludge so that it floats on the lagoon's surface, and surface currents carry this floating sludge and associated matter to the quiescent downstream end of the lagoon where it is removed.

In actual practice, however, the method disclosed in the above mentioned patent has one principal drawback. Because of wave and wind action in an outdoor lagoon having a surface area exceeding several thousand square feet, most of the floating matter sinks to the bottom of the lagoon before it reaches the lagoon's downstream end. This submerged matter stagnates and becomes anaerobic, introducing offensive taste and odor contaminants into water. Eventually this stagnant matter must be removed. At the American Oil Company's Whiting refinery, it cost about $200,000 to dredge up this matter and haul it away. Various methods have been suggested to skim the buoyant matter from the surface of the lagoon before it has an opportunity to sink, but all these methods have been too costly, and therefore, impractical.

DESCRIPTION OF THE INVENTION

We have invented a simple, reliable, and relatively inexpensive process for removing floating matter from the surface of a bioflotation lagoon. This process is characterized by the use of floating barrier means which confine the floating matter to the lagoon's upstream end. The barrier means preferably comprises inflatable, elongated plastic sacks having baffle means which extend below the lagoon's surface. These barriers are connected across the lagoon, extending transverse to the direction of flow of the water. Conventional stationary aerators, located at the upstream end of the lagoon in advance of the barrier means, beat air into the lagoon's surface. This generates surface currents of from about 0.1 to about 2.0 feet per second. Desirably the aerators are operated so that the surface currents will be about 0.3 feet per second at the location where the buoyant matter is removed. We prefer to confine the floating matter to an upstream area encompassing from about ¼ to about ½, preferably about ⅓, of the total surface area of the lagoon.

To remove this floating matter from the lagoon's surface, skimmers are located along the barriers, preferably at the apex formed by the junction of the barriers. The preferred skimmers include a rotating steel drum mounted on floating means. The drum may be rotated with the flow of surface water so that it tends to push floating matter of a viscous nature beneath the lagoon's surface as the sludge meets the rotating steel surface of the drum. The drum may also be rotated against the flow of surface water. This is done when the floating matter is free flowing such as a No. 2 Fuel Oil. Scraper means in tangential contact with the drum's surface scrape adhering matter from this surface. This matter is collected in a receptacle and then removed by means of a sump pump, or the like, for disposal.

DESCRIPTION OF THE DRAWINGS

FIG. 2 is a sectional view taken along line 2—2 of FIG. 1.

DESCRIPTION OF THE PREFERRED EMBODIMENT

Figure 1:
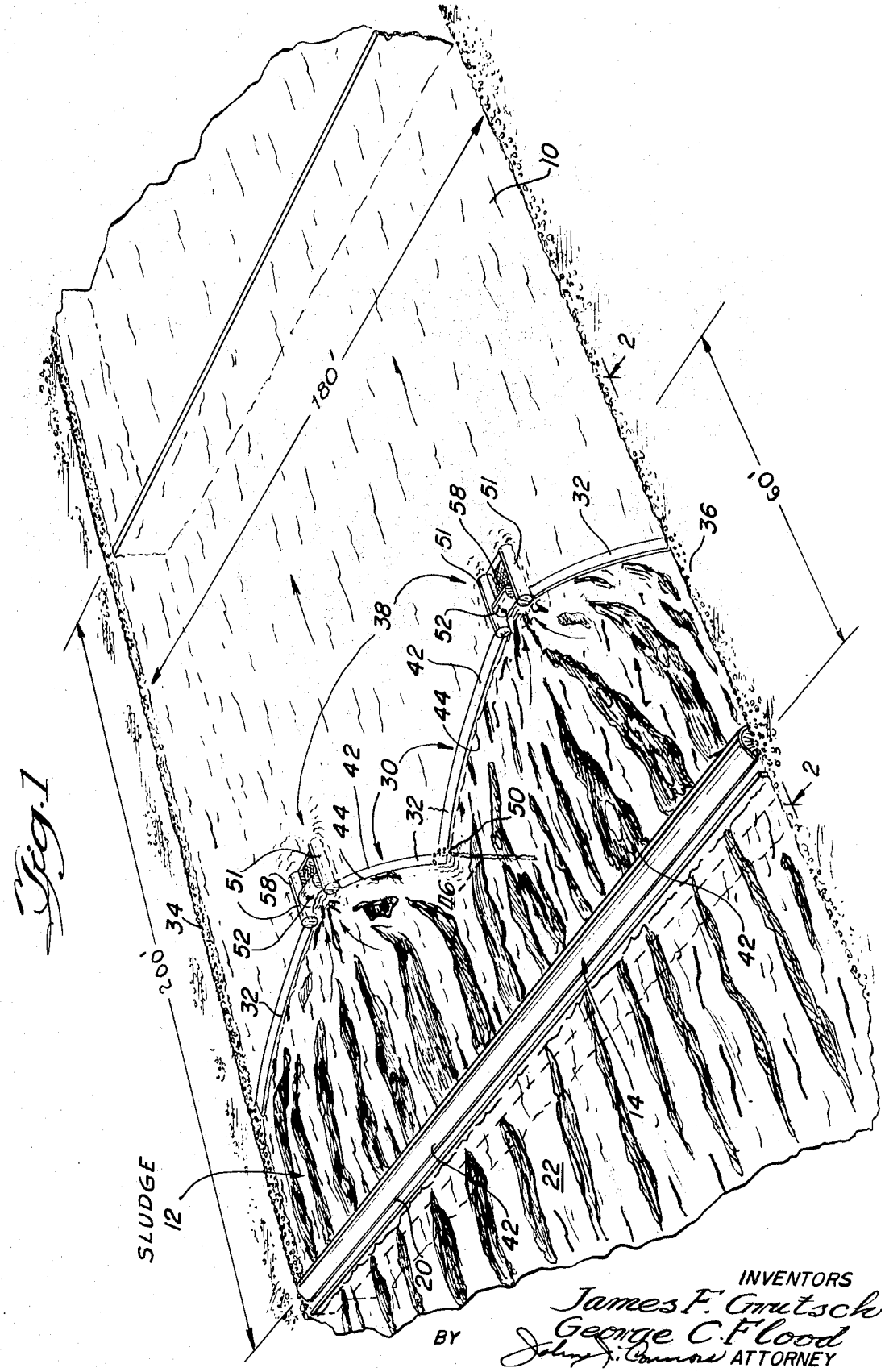
FIG. 1 is a perspective view schematically illustrating the water purification process of our invention.

The water purification process shown in FIGS. 1 and 2 includes bioflotation lagoon 10 in which thrive aquatic microorganisms that feed on pollutants in the water and produce a sludge and associated buoyant matter 12. This system is particularly adapted to treat waste-water from an oil refinery, and the microorganisms and sludge in lagoon 10 occlude pollutants such as oil in the water; thus, the buoyant matter 12 tends to be oily.

A row of stationary aerators 14 stretches across lagoon 10, and these aerators 14 include a plurality of flat blades 16 which bristle forth in a radial fashion from rotating power shaft 18. Blades 16 beat air into lagoon 10 and churn surface water, generating surface currents $a$, and sub-surface eddy currents $b$. Currents $a$ have a velocity of from about 0.1 to about 2.0 feet per second. Hood 20 covers the row of aerators 14 and aids in forcing air down into the surface of lagoon 10. As oil refinery waste-water 22 from an API separator and/or pre-settler pond flows through channel 24 defined by partitions 26 and 28, the air introduced into lagoon 10 buoys up sludge and associated matter 12, and surface currents carry this buoyant matter 12 to boom-skimmer apparatus 30, located downstream from aerators 14.

Boom-skimmer aparatus 30 includes floating barrier means or booms 32, connected to opposite banks 34 and 36 of lagoon 10, and skimmers 38 along booms 32. Booms 32, which extend across the lagoon, transverse to the direction of surface current $a$, confine floating matter 12 to the upstream end of lagoon 10. The area encompassed between aerators 14, boom skimmer apparatus 30, and banks 34 and 36, is about ⅓ of the lagoon's total surface area. Surface currents $a$ push buoyant matter 12 towards skimmers 38, and submerged baffles 40 attached to booms 32 prevent buoyant matter 12 from slipping beneath booms 32. Baffles 40 are about two feet below the lagoon's surface. Preferably booms 32 have dual concave sections 42 that act as guideways for directing buoyant matter 12 towards skimmers 38. Each section 42 has sides 44 which taper inwardly and are connected to oposite ends of skimers 38. Post 46, driven into the lagoon's bottom 48, anchors midsection 50 of booms 32.

Each skimmer 38 is mounted between pontoons 51 floating on the lagoon's surface. These skimmers 38 include rotating drums 52 having a smooth, steel or plastic surface 54. For viscous matter, drums 52 preferably rotate with currents *a* so that they tend to push buoyant matter 12 beneath the lagoon's surface as the buoyant matter meets the rotating surface 54 of drums 52. For free flowing matter, drums 52 rotate against currents *a* for best efficiency. Buoyant matter 12 adheres to these surfaces 54, and scrapers 56 in tangential contact with the surface scrape the matter therefrom and deposit it in receptacle 58. Sump pumps (not shown) withdraw this matter 12 from receptacles 58 to a point of disposal. Suitable skimmers can be obtained from the Rex Chainbelt Corporation of Milwaukee, Wis.

Using the particular boom-skimmer 30 illustrated, about 90 feet is the maximum span that can be covered by one boom-skimmer arrangement. If the boom-skimmer 30 arrangement is moved closer to aerators 14, the velocity of currents *a* sweep an increasingly greater portion of buoyant matter 12 under and past booms 32. If the angle between booms 32 joining skimmers 38 is increased, buoyant matter 12 tends to "pile-up" and not move along booms 32 to skimers 38. If skimmers 38 are moved farther downstream to permit booms 32 to cover a greater span, reduced surface current velocities cannot always overcome wind or wave action and keep buoyant matter 12 moving to drum skimmers 38. These parameters are thus adjusted in accordance with the size of the lagoon and speed of surface currents to maximize removal of buoyant matter.

We claim:

1. An improved process for purifying contaminated water flowing through an aerated lagoon exposed to winds which cause waves, said lagoon having a surface area of several thousand square feet and said water flowing through the lagoon into the lagoon's upstream end and then from the lagoon's downstream end, and being aerated at the lagoon's upstream end by means that physicaly force air into the lagoon so that matter is buoyed up and carried by surface currents generated by the aerating means toward the lagoon's downstream end, but said bouyed-up matter sinking due to wave and wind action before reaching said downstream end, the improvement comprising (a) positioning skimming means in combination with barrier means across the surface of the lagoon whereby buoyant matter floating on the surface of the water at its upstream end is confined to an area comprising about one-fourth to about one-half the area of the lagoon;

(b) positioning the aerating means at the inlet end of the lagoon on the upstream side of said skimming and barrier means and spaced apart therefrom so that it is located at the opposite end of the lagoon area defined by the skimming and barrier means;

(c) operating the aerating means so that it both aerates the water at the inlet end of said area and imparts currents in the surface of the water within said area, said currents being made to flow in the direction of said skimming and barrier means and being characterized by velocities of about 0.1 to about 2.0 feet per second as measured at said skimming means;

(d) operating the skimming means so that buoyed-up matter conveyed by said current velocities and collected at said skimming and barrier means is removed by said skimming means.

References Cited

UNITED STATES PATENTS 3,314,540  4/1967  Lane _____ 210—242 X
2,948,677  8/1960  Austin et al. _____ 210—44

REUBEN FRIEDMAN, Primary Examiner

T. A. GRANGER, Assistant Examiner